No. 871,676. PATENTED NOV. 19, 1907.
W. G. DAVIES.
AUTOMATIC PORTABLE WEIGHING SCOOP.
APPLICATION FILED APR. 22, 1907.

Witnesses
Edward W. Creeman.
Arleta Adams.

Inventor
William G. Davies.

By
Adams & Brooks
Attorneys

UNITED STATES PATENT OFFICE.

WILLIAM G. DAVIES, OF SEATTLE, WASHINGTON.

AUTOMATIC PORTABLE WEIGHING-SCOOP.

No. 871,676.   Specification of Letters Patent.   Patented Nov. 19, 1907.

Application filed April 22, 1907. Serial No. 369,683.

*To all whom it may concern:*

Be it known that I, WILLIAM G. DAVIES, a citizen of the United States of America, and a resident of the city of Seattle, in the county of King and State of Washington, have invented certain new and useful Improvements in Automatic Portable Weighing-Scoops, of which the following is a specification.

My invention has for its primary object the provision of an improved construction of the type indicated which can be carried to the bin or other receptacle containing the desired material and employed, first as a scoop to remove the material from the bin, then as a scale for weighing such material.

A further object resides in the provision of a suitable releasable connection through the medium of which the scoop part of the device can, when desired, be secured in rigid relation to the hand part.

With the above and other desirable objects in view, to be referred to as the description progresses, the invention resides in the features of construction hereinafter described and succinctly defined in the appended claims.

Figure 1:
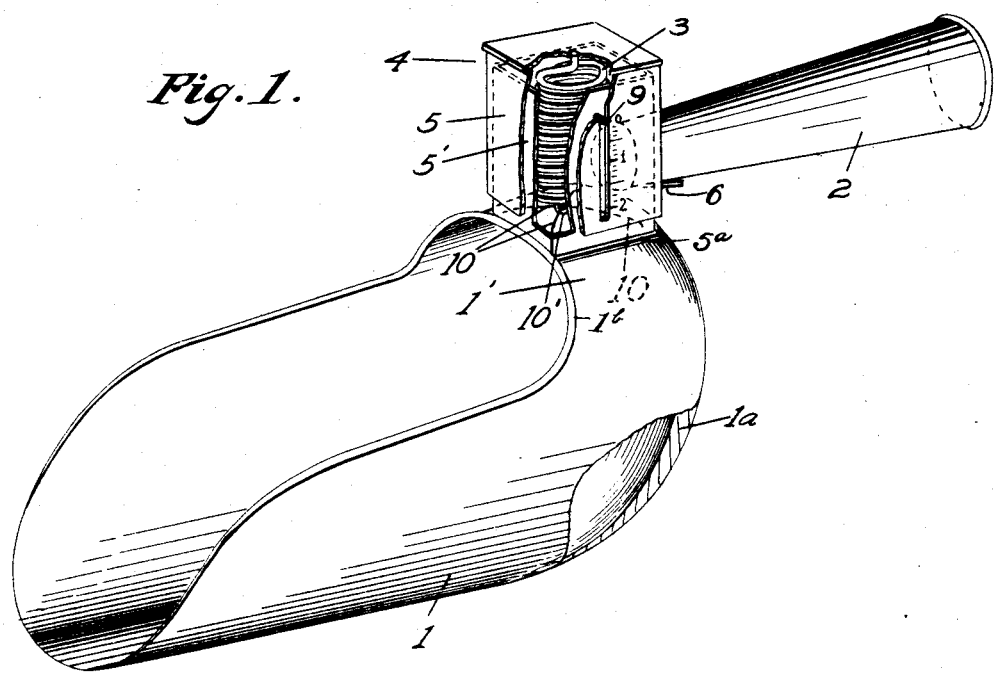
Figure 2:
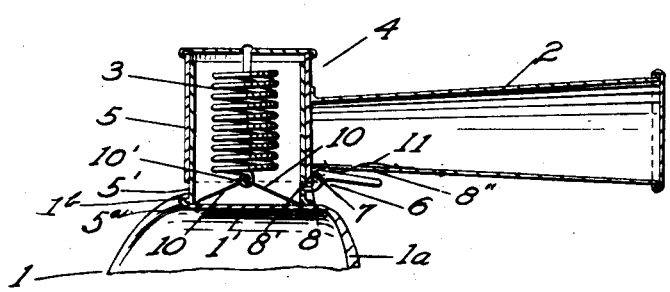

Referring now to the accompanying drawing, in which like numerals of reference indicate like parts throughout the several views: Figure 1 is a view in perspective of my invention, parts being broken away, and Fig. 2 is a vertical longitudinal section taken through the scale casing, handle or hand part, and the upper portion of the scoop.

In carrying out my invention I provide a suitable scoop, as 1, and a handle or hand part 2, between which there is a yielding connection in the form of a spring 3. This spring, in the present embodiment, is a part of the scale 4, whose casing is formed of telescoping sections 5, 5', the lower of which is fixed to scoop 1 and the upper having handle or hand part 2, which projects rearwardly therefrom, fixed thereto, in any desired manner.

As now considered, the lower section of the scale casing is secured to a laterally extending wall portion 1', which is formed integral with the side and end walls of the scoop, at a point in proximity to the rear end portion of said scoop, and therefore in order to bring the center of gravity of the scoop directly beneath the scale, and thereby obviate friction between the respective sections of the scale casing, I weight the rear portion of said scoop by increasing the thickness of its end wall, as at $1^a$. By connecting the scale to the scoop at a point forwardly of that shown in the drawing, I am enabled to reduce or entirely remove the added weight to the rear wall of the scoop, as is obvious.

Reference numeral 6 indicates a releasable connection between the handle or hand part 2 and the scoop 1, the same comprising a catch pivoted at 7 to said handle and having an angular tongue 8 adapted for engagement in an aperture 8' formed in the rear wall of scale section 5', and a rearwardly projecting arm or finger part adapted to be engaged and pressed upwardly against the tension of a spring 11, into a slot 8'' in the handle or hand part 2 to release tongue 8 and thereby permit of the weighing operation being carried on. Casing section 5 is formed in one of its side walls with a vertical slot through which a pointer 9 fixed to casing section 5' projects, and this pointer moves across suitable marks of indication, representing pounds and fractions, provided on said casing section 5 to one side of the slot thereof. Spring 3 has one end secured to the top wall of casing section 5 and its other end secured by wires 10, which pass through an eye 10' thereof, to the scoop, see Fig. 2. Casing sections 5, 5' are preferably square in cross section, whereby they will be prevented from twisting or turning one on the other.

By my improved device, the requirement of walking back and forth from the bin or other receptacle containing the desired material, to a scale arranged on the counter, as now practiced, is obviated, as the operator holding my device by the handle or hand part 2 can scoop from the bin the material as with an ordinary scoop, then by releasing the scale casing sections by pressing with his finger, the finger part or arm of releasable connection 6 upwardly, as heretofore described, weighing of the material in the scoop can be accomplished.

Casing section 5' is formed at its lower portion with a flange $5^a$, a part of which is engaged beneath and firmly held by a flange $1^b$ of the laterally extending wall portion 1', while the remaining portion of said flange $5^a$ is soldered or otherwise secured to said wall portion 1'.

While I have herein described and shown an embodiment of my invention which will carry out the functions assigned thereto, I reserve the right to make alterations and changes in the details of construction, as fall within the scope of the appended claims.

Having thus fully described my invention, what I claim as new and desire to secure by Letters Patent of the United States, is:—

1. A device of the type set forth comprising a scoop having a laterally extending portion at its top, a scale having a casing formed of telescoping sections which are angular in cross section, one of said sections being fixed to said laterally extending portion of the scoop, and a hand part fixed to the other section of the scale casing, for the purpose specified.

2. A device of the type set forth comprising a scoop having a laterally extending portion connecting its side walls and formed with a flange, a scale having a casing formed of telescoping sections one of which is formed with a flange secured beneath the flange of said laterally extending portion of said scoop, and a hand part fixed to the other section of said casing.

Signed at Seattle, Washington this 12th day of April 1907.

WILLIAM G. DAVIES.

Witnesses:
 JOHN W. FILKINS,
 ARLITA ADAMS.